(12) United States Patent (10) Patent No.: US 12,568,193 B2

Perrone et al. (45) Date of Patent: Mar. 3, 2026

(54) METHOD OF PIXEL-BY-PIXEL REGISTRATION OF AN EVENT CAMERA TO A FRAME CAMERA

(71) Applicant: PROPHESEE, Paris (FR)

(72) Inventors: Daniele Perrone, Noisy-le-Grand (FR); Jacques Manderschied, Paris (FR); Stephane Valente, Paris (FR)

(73) Assignee: PROPHESEE, Paris (FR)

( * ) Notice: Subject to any disclaimer, the term of this patent is extended or adjusted under 35 U.S.C. 154(b) by 618 days.

(21) Appl. No.: 17/657,724

(22) Filed: Apr. 1, 2022

(65) Prior Publication Data

US 2022/0329771 A1 Oct. 13, 2022

(30) Foreign Application Priority Data

Apr. 2, 2021 (EP) .................................... 21166844

(51) Int. Cl.
| | |
|---|---|
| *H04N 13/128* | (2018.01) |
| *G06T 7/32* | (2017.01) |
| *H04N 13/25* | (2018.01) |

(52) U.S. Cl.
CPC ............. *H04N 13/128* (2018.05); *G06T 7/32* (2017.01); *H04N 13/25* (2018.05); *G06T 2207/10012* (2013.01)

(58) Field of Classification Search
CPC .... H04N 13/128; H04N 13/25; H04N 13/239; H04N 13/246; H04N 13/271;
(Continued)

(56) References Cited

U.S. PATENT DOCUMENTS

| | | | |
|---|---|---|---|
| 2013/0266209 A1* | 10/2013 | Matsuda ............. | H04N 13/128 |
| | | | 382/154 |
| 2017/0169550 A1* | 6/2017 | Dewhurst ............. | G06V 20/58 |

(Continued)

FOREIGN PATENT DOCUMENTS

| | | | | |
|---|---|---|---|---|
| WO | WO-2018037079 A1 * | 3/2018 | ............. | G06T 15/06 |

OTHER PUBLICATIONS

Z. W. Wang, P. Duan, O. Cossairt, A. Katsaggelos, T. Huang and B. Shi, "Joint Filtering of Intensity Images and Neuromorphic Events for High-Resolution Noise-Robust Imaging," 2020 IEEE/CVF Conference on Computer Vision and Pattern Recognition (CVPR), Seattle, WA, USA, 2020, pp. 1606-1616 (Year: 2020).*

(Continued)

*Primary Examiner* — Samir A Ahmed

(57) ABSTRACT

A method for registering pixels provided in a pixel event stream comprising: acquiring image frames from a frame-based camera, each image frame being generated using an exposure period; generating a first point matrix from one or more of the image frames, the first point matrix being associated with an acquisition period of the image frames; acquiring a pixel event stream generated during the acquisition period; generating a second point matrix from pixel events of the pixel event stream, occurring during the acquisition period of the first point matrix; computing a correlation scoring function applied to at least a part of the points of the first and second point matrices, and estimating respective positions of points of the second point matrix in the first point matrix, due to depths of the points of the first point matrix related to the second point matrix, by maximizing the correlation scoring function.

17 Claims, 3 Drawing Sheets

(58) Field of Classification Search
CPC ........ H04N 23/45; H04N 23/90; H04N 25/42;
H04N 25/50; H04N 25/705; G06T 7/32;
G06T 2207/10012; G06T 2207/10016;
G06T 7/30; G06T 7/55; G06T
2207/10028; G06T 2207/20228
See application file for complete search history.

(56) References Cited

U.S. PATENT DOCUMENTS

| | | | |
|---|---|---|---|
| 2018/0075592 A1* | 3/2018 | White | G06T 7/30 |
| 2018/0137639 A1* | 5/2018 | Zou | G06T 7/593 |
| 2018/0332222 A1* | 11/2018 | Yao | H04N 13/246 |
| 2022/0383530 A1* | 12/2022 | Giryes | G03B 35/08 |

OTHER PUBLICATIONS

L. Pan, C. Scheerlinck, X. Yu, R. Hartley, M. Liu and Y. Dai, "Bringing a Blurry Frame Alive at High Frame-Rate With an Event Camera," 2019 IEEE/CVF Conference on Computer Vision and Pattern Recognition (CVPR), Long Beach, CA, USA, 2019, pp. 6813-6822 (Year: 2019).*

European Patent Office Extended Search Report, Application No. 21166844.7, Sep. 21, 2021, 8 pgs.

Perot, et al., "Learning to Detect Objects with a 1 Megapixel Event Camera", Dec. 2020, 20 pgs.

Wang, et al., "Joint Filtering of Intensity Images and Neuromorphic Events for High-Resolution Noise-Robust Imaging", 2020 IEEE/ CVF Conference on Computer Vision and Pattern Recognition (CVPR), 11 pgs.

Gallego, et al., "Event-based Vision: A Survey", Aug. 2020, 30 pgs.

\* cited by examiner

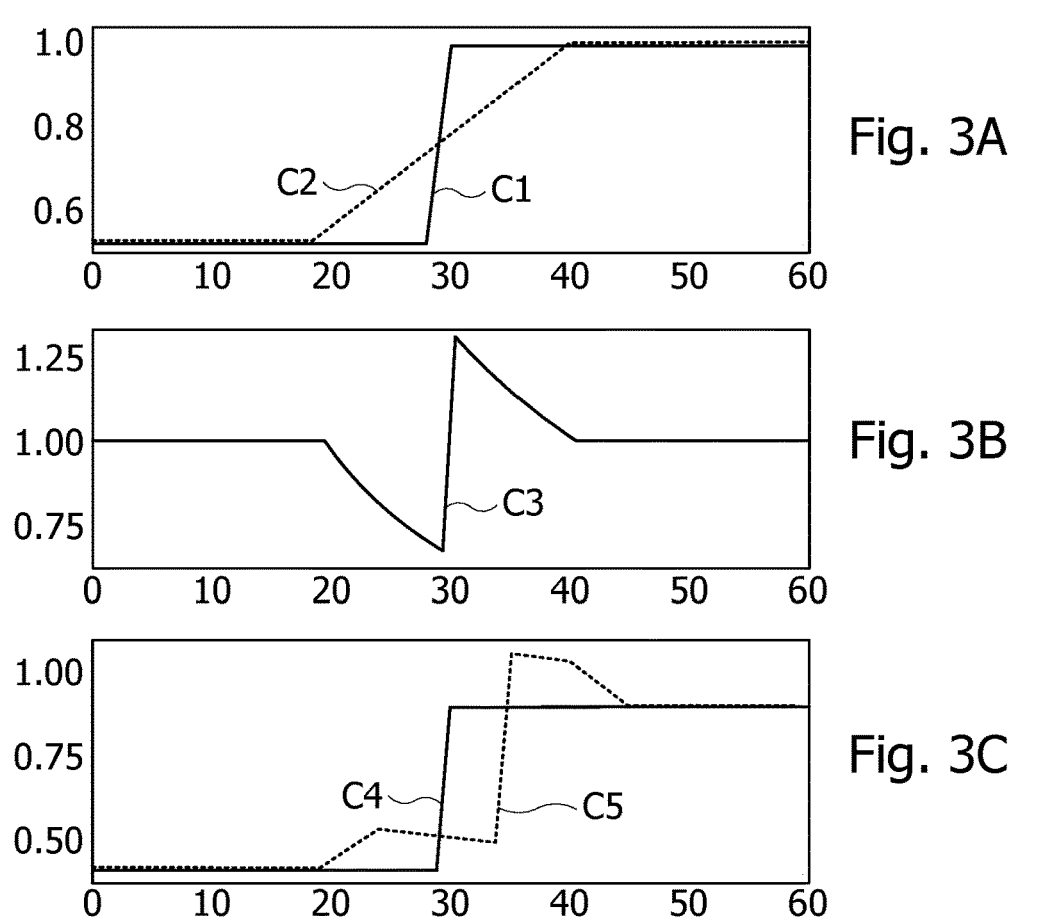
Fig. 3A
Fig. 3B
Fig. 3C
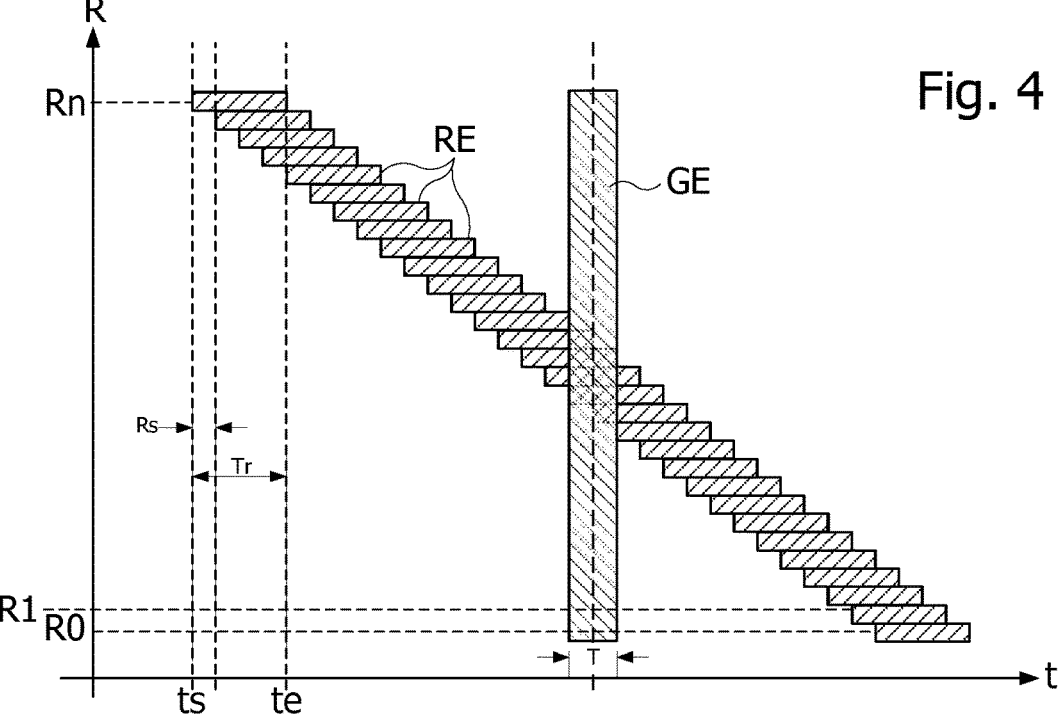
Fig. 4

METHOD OF PIXEL-BY-PIXEL REGISTRATION OF AN EVENT CAMERA TO A FRAME CAMERA

CROSS-REFERENCE TO RELATED APPLICATION

This application is based on and claims priority under 35 U.S.C. 119 to European Patent Application No, EP21166844.7 filed on Apr. 2, 2021, the disclosure of which is herein incorporated by reference in its entirety.

FIELD

The present disclosure relates to a method and device for pixel-by-pixel registration of an event-based camera to a frame-based camera in presence of a scene that presents objects at different distances from the cameras, using stereo correspondences.

BACKGROUND

An event-based camera includes a visual sensor that does not capture images or frames using a shutter as image sensors of conventional frame-based cameras, but responds to local changes in brightness such that each pixel of the visual sensor operates independently and asynchronously, reporting relative changes in brightness as they occur, and staying silent otherwise.

Image registration is a process that establishes a pixel-to pixel mapping or links between objects imaged by two cameras viewing a same scene. Such a registration is needed when the sensors are integrated into two distinct cameras. Thus, the two cameras have respective viewpoints that are necessarily different. Scene depth or depths of objects seen by the cameras from different viewpoints result in parallax, which in turn results in disparities in the image objects projected on the focal planes of the camera sensors.

Such a registration is performed for image and video enhancement using events, or event enhancement, such as event denoising. Such a registration is also performed to generate a depth or disparity map to be used in any application requiring 3D information of a scene. Solutions for 3D estimation exist, involving two or more cameras, of the same type, frame-based or event-based.

In traditional stereo vision, two cameras, spaced and aligned horizontally from one another are used to obtain images of two differing views on a scene, in a manner similar to human binocular vision. By correlating imaged objects in these two images, relative depth information can be obtained in the form of a disparity map, which encodes the difference in horizontal coordinates of corresponding image points. The values in the disparity map are inversely proportional to the scene depth at the corresponding pixel location.

For a human to compare the two images, they must be superimposed in a stereoscopic device, with the image from the right camera being shown to the observer's right eye and from the left one to the left eye. In a computer vision system, several pre-processing steps can be performed:

Each image is undistorted, such that barrel distortion and tangential distortion are removed. This ensures that the observed image matches the projection of an ideal pinhole camera.

Each image is projected onto a common plane to allow comparison of the image pairs, known as image rectification.

An information measure which compares the two images is minimized. This gives the best estimate of positions of features in the two images, and creates a disparity map.

Optionally, the disparity map is projected into a 3D point cloud to form a depth map. By using camera projective parameters, the point cloud can be computed such that it provides measurements at a known scale.

Many solutions already exist for performing a registration between two frame-based cameras. These solutions have been developed to retrieve depth information from a dual camera system, using the principles of binocular vision ([1], [2], [3], [4], [5]). These solutions often require the following steps:

Camera calibration: this process, done offline, is required to have the full knowledge of the camera system.

Camera rectification: this process modifies the camera viewpoint so that the search for corresponding pixels is performed along pixel rows of the sensor. If the camera rectification is not performed, the search can still be performed by computing an epipolar curve per pixel, which does not follow the pixels rows of the sensor. Thus, the rectification algorithm is less efficient.

Matching: the matching often involves optimization algorithms that try to minimize the photometric distance between pixels, with in addition regularization terms that force the shill (called also disparity) to vary smoothly between pixels.

To perform a registration between two event-based cameras, it has been shown in [6, 14] that it is possible to use a temporal matching instead of a photometric matching.

These methods, commonly known as stereo methods cannot be easily generalized to a pair of cameras combining one frame-based camera and one event-based camera, due to the different nature of the signals coming from the cameras. The 2D array of pixels of frame-based cameras measure the intensity (or color intensity) of the impinging light at regularly sampled time intervals to produce a 2D image, whereas event-based cameras do not produce 2D images, but a stream of discrete events, in which events are asynchronously produced as soon as a relative brightness change of the impinging light is detected.

In addition, event-based cameras can have a different (typically lower) spatial resolution than frame-based ones. Therefore, the mapping between the two cameras cannot be bijective, as one pixel of the event-based camera can for example correspond to many pixels in the frame-based camera.

Some frame-based cameras have a rolling shutter sensor capturing each frame, not by taking a snapshot of the entire scene at a single instant in time as when using a global shutter, but rather by scanning across the scene rapidly, either vertically or horizontally. Generally, one pixel row or a group of several pixel rows of a rolling shutter sensor is scanned at a single instant, and the pixel rows or groups of pixel rows of the sensor are scanned at different instants. If not explicitly handled, rolling shutter can bias the estimated depth in a stereo system, as shown in [5].

Therefore, it may be desirable to establish a pixel-by-pixel registration between pixel events from an event-based sensor and images from a frame-based sensor. Also, it may be desirable to address also the case in which the frame-based camera has a rolling shutter sensor.

SUMMARY

A method is described for registering pixels provided in a pixel event stream by an event-based camera, with pixels in an image provided by frame-based camera. The method may include: acquiring image frames from a frame-based camera, each image frame being generated using an exposure period; generating a first point matrix from one or more of the image frames, the first point matrix being associated with an acquisition period of the image frames; acquiring a pixel event stream generated during the acquisition period; generating a second point matrix from pixel events of the pixel event stream, occurring during the acquisition period of the first point matrix; computing a correlation scoring function applied to at least a part of the points of the first and second point matrices, and estimating respective positions of points of the second point matrix in the first point matrix, due to depths of the points of the first point matrix related to the second point matrix, by maximizing the correlation scoring function.

According to an embodiment, the method further comprises: generating a rectified first point matrix obtained by projecting the first point matrix on a common image plane with a first image resolution, and generating a rectified second point matrix obtained by projecting the second point matrix on the common image plane with the first image resolution, the estimation of respective positions of points of the second point matrix being performed from the rectified first and second point matrices.

According to an embodiment, the positions of points of the second point matrix in the first point matrix are represented by a disparity map or a depth map of at least one patch of adjacent points, or are used to generate a modified image based on one of the image frames.

According to an embodiment, the method further comprises generating and unrectifying the disparity or depth map, or unrectifying the modified image, to an image plane of the frame-based or event-based camera.

According to an embodiment, the correlation scoring function evaluates smoothness of at least one patch of adjacent points in a combined point matrix resulting from a combination of the first and second point matrices.

According to an embodiment, the correlation scoring function is one of the following functions: a norm of 2D gradients of the combined point matrix, a variance of local patches of the combined point matrix, and a cross-correlation function applied to the first and second point matrices.

According to an embodiment, the method further comprises: generating a third point matrix by integrating pixel events from the pixel event stream occurring during the exposure period of the first point matrix; rectifying the third point matrix to project points of the third point matrix on the common image plane with a resolution of the image frames; generating a translated point matrix by translating points of the rectified third point matrix by applying point translations defined by a disparity map; un-rectifying the translated point matrix to project the translated image on an image plane of the frame-based camera; and combining one of the image frames used to generate the first point matrix with the un-rectified translated point matrix to obtain a deblurred image.

According to an embodiment, the first point matrix is one of the image frames acquired from the frame-based camera, and the second point matrix is generated by integrating pixel events from the pixel event stream, occurring during an exposure period of the first point matrix.

According to an embodiment, the second or third point matrix is a correction point matrix to be multiplied to one of the image frames to obtain a deblurred image, the deblurred image being generated at a frame rate of the image frames, or at intervals between two successive image frames of the image frames to provide a slow-motion video stream at a higher frame rate than the frame rate of the image frames.

According to an embodiment, the first point matrix is generated by computing a ratio of two successive image frames acquired from the frame-based camera, the second point matrix being generated by integrating pixel events from the pixel event stream, occurring during a period delimited by instants corresponding to the two successive image frames.

According to an embodiment, the correlation scoring function is one of the following functions: a cross-correlation function applied to at least one patch of adjacent points of the first and second point matrices, a sum of absolute point-wise differences applied to at least one patch of adjacent points of the first and second point matrices, and a sum of squared point-wise differences applied to at least one patch of adjacent points of the first and second point matrices.

According to an embodiment, the points of the first point matrix have binary values determined on the basis of comparisons performed between corresponding pixels in two successive image frames acquired from the frame-based camera, and the points of the second point matrix have binary values set to 0 or 1 depending on the presence of at least one event for a corresponding pixel in the event stream during a period delimited by instants corresponding to the two successive image frames.

According to an embodiment, the scoring function evaluates similarity between the first point matrix and the second point matrix using logical operations applied to patches of adjacent points in the first and second point matrices.

Embodiments may also relate to a stereo camera device comprising a frame-based camera, an event-based camera and a processor receiving and processing signals provided by the frame-based and event-based cameras, the processor being configured to implement the steps of the method as defined above.

Embodiments may also relate to a computer program product directly loadable into an internal memory of a computer and comprising code portions which when executed by a computer configure the computer to implement the steps of the method as defined above.

BRIEF DESCRIPTION OF THE DRAWINGS

The method and/or device of the present disclosure may be better understood with reference to the following drawings and description. Non-limiting and non-exhaustive descriptions are provided with the following drawings. In the figures, like referenced signs may refer to like parts throughout the different figures unless otherwise specified.

FIGS. 3A, 3B, 3C show time-varying curves of ideal and real pixel signals, a correction signal and combinations of the real and correction signals, respectively;

FIG. 4 illustrates a block diagram illustrating integration or exposure periods in a rolling shutter camera and in a global shutter camera;

DETAILED DESCRIPTION

Figure 1:
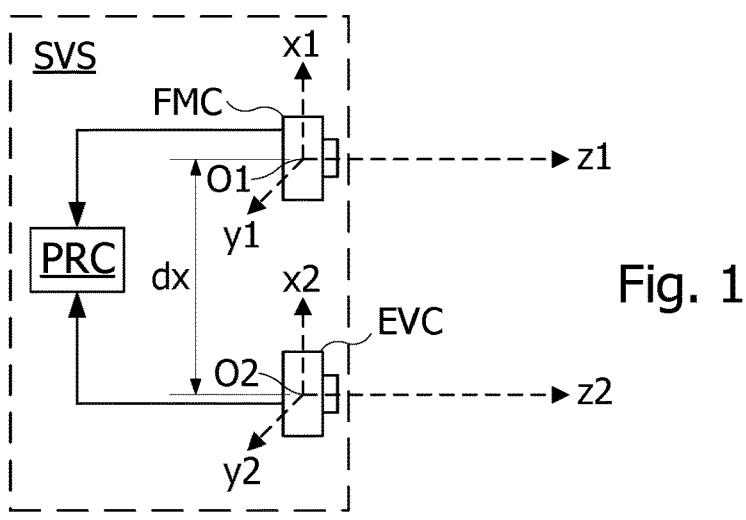
FIG. 1 illustrates a block diagram of a stereo camera system according to an embodiment.

FIG. 1 illustrates a stereo camera device SVS comprising a frame-based camera FMC, an event-based camera EVC and a processor PRC receiving and processing signals provided by cameras FMC, EVC. The frame-based camera FMC and the event-based camera EVC observe a same scene including objects at different distances from the cameras FMC, EVC. The frame-based camera FMC captures and generates image frames of the scene. The image frames generated by camera FMC may be greyscale or color images such as RUB images. The event-based camera EVC generates a stream of asynchronous events detected in the scene and related to moving objects captured during the acquisition of the image frames. Each of the frame-based camera FMC and the event-based camera EVC is integrated into the camera system SVS so as to have a respective pointing direction z1, z2, and a respective image plane (O1, x1, y1), (O2, x2, y2). The points O1, O2 may be positioned on respective centers (or upper left corner) of the sensors of the cameras FMC, EVC. The points O1, O2 are spaced from each other at a distance dx. The pointing directions z1, z2 are not necessarily the same. The same is true for the axes x1, x2 and the axes y1, y2 of the image planes (O1, x1, y1), (O2, x2, y2). In addition, the event-based visual sensors have typically a lower resolution than the frame-based sensors, and the lenses focusing the scene on the respective image planes of the cameras FMC and EVC may have their own distortions.

In the following, different methods are disclosed for pixel-by-pixel registration between pixels of frames provided by the frame-based camera FMC and pixel events provided by the event-based camera EVC. Such a registration is needed in particular since each of the cameras FMC, EVC has its own point of view and the depths of the objects in the observed scene result in some parallax which in turn results in disparities or shifts between the image objects respectively imaged on the sensors of the cameras FMC, EVC.

A first key component of the registration is an accurate synchronization between the events from the camera EVC and the frames from the camera FMC, knowing that the camera FMC may produce one image frame with a frame period of 33 ms, whereas the camera EVC may provide 1.2 109 events per second, i.e. 4 107 events during the frame period.

According to an embodiment, the clocks of the cameras FMC, EVC are synchronized using a synchronization signal that is transmitted from one of the cameras FMC, EVC to the other one. Such a synchronization signal may be a flash signal typically provided by the camera FMC to trigger the flash to mark the start of an exposure time. If the camera FMC has a global shutter sensor, the exposure time of each image frame from the camera FIC is also transmitted to the processor PRC. If the camera FMC has a rolling shutter sensor, the exposure time of the first row and the start time of the exposure of the last row of the image sensor relative to the start time of the exposure of the first row are transmitted to the processor PRC.

A second key component of the registration is to determine a stereo matching distance between pixels of image frames and events. According to an embodiment, matching is determined between an image frame I and a set of events E occurring during exposure period of image frame I. It is assumed that within the exposure period of the frame I there is not a significant depth change in the observed scene, such that the mapping between image frame I and the set of events E is constant.

Figure 2:
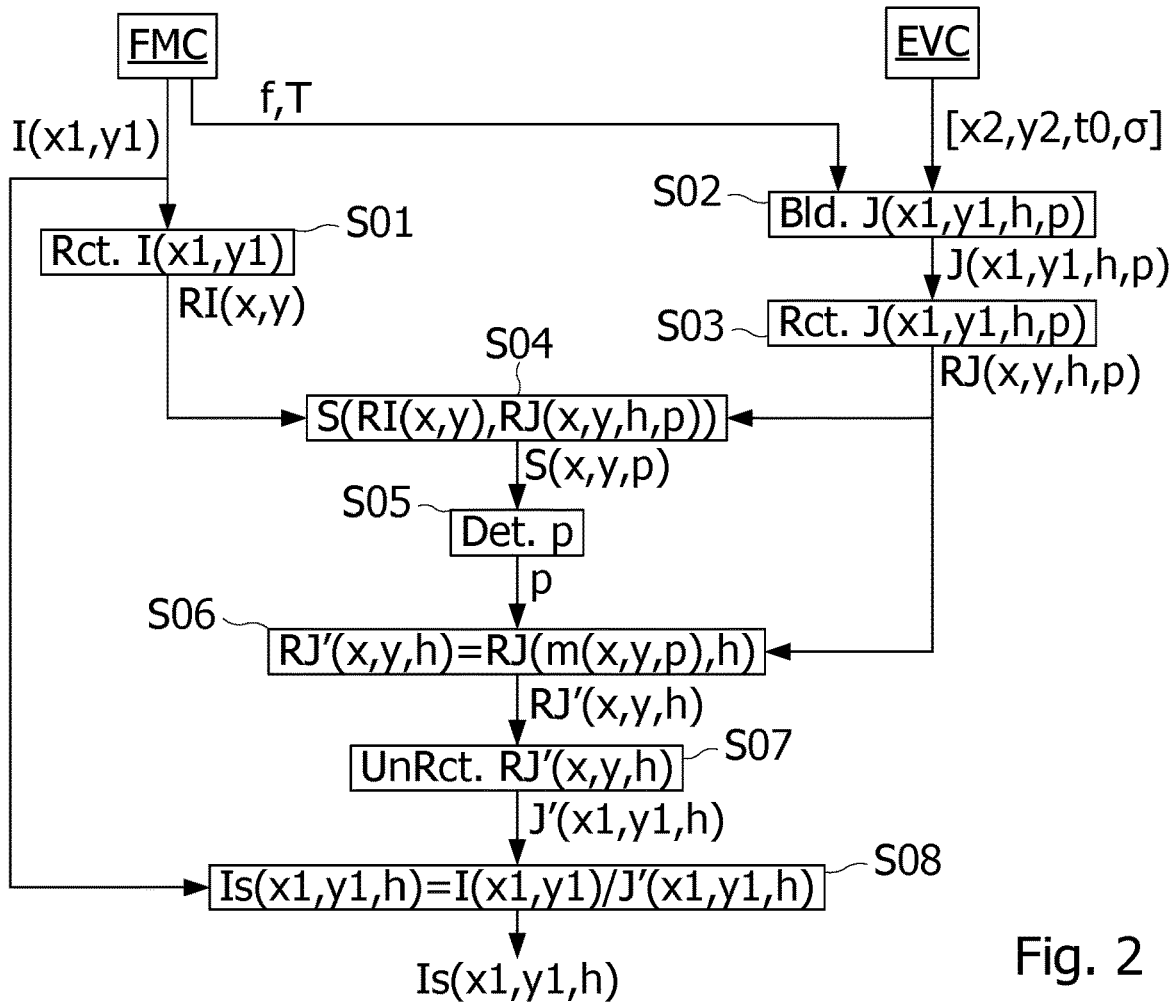
FIG. 2 illustrates a block diagram showing steps of a method for pixel-by-pixel registration of an event-based camera to a frame-based camera, according to an embodiment.

FIG. 2 illustrates steps S01 to S08 of an embodiment of a method for pixel-by-pixel registration, that can be implemented by processor PRC. The registration is performed between the pixels of the frames provided by the frame-based camera FMC and the pixel events provided by the event-based camera EVC. The camera. FMC produces at an instant f an image frame I where I(x1,y1) are pixel coordinates of pixels in the image plane (O1, x1, y1) of camera FMC, according to an exposure period T (see FIG. 1). The camera EVC produces pixel events denoted by [x2,y2,t0,σ], where (x2,y2) are pixels coordinates of the pixel in the image plane (O2, x2, y2) of the camera EVC, t0 is the time of the event and σ is a polarity equal to +1 if the brightness change is positive with respect to a logarithmic brightness change threshold c, and −1 if negative. Note that the brightness threshold c can have different values for positive and negative polarities, but this possibility is omitted for clarity purpose.

At step S01, the image frame I is rectified to generate a rectified image RI having a given size of W×H pixels, the pixels of frame I being projected in a common image plane (O, x, y). The rectification computation may include a linear transformation, rotations around axes x1, y1 and z1, a scaling transformation to obtain an image size W×H and other transformation to correct image distortions. Some of the parameters of defining these transformations can be obtained by calibration.

In parallel with step S01, a point matrix J is built in the image plane (O2, x2, y2) of camera FMC at step S02. Step S02 is performed using the instant f and the exposure period duration T.

The relationship between a potentially blurry image I and corresponding events may be expressed by the following equation:

$$I\left(x1, y1, \left[f - \frac{T}{2}, f + \frac{T}{2}\right]\right) = \frac{I_s(x1, y1, h, p)}{T} \int_{f-\frac{T}{2}}^{f+\frac{T}{2}} e^{c \cdot INT(x1,y1,h,t,p)} dt \tag{1}$$

where:

$$INT(x1,y1,h,t,p) = \int_h^t ev(m(x1,y1,p),s)ds \tag{2}$$

I(x1,y1,[f−T/2,f+T/2]) is a pixel value at coordinates (x1,y1) in an image I produced by camera FMC in image plane (O1,x1,y1) with an exposure period starting at f−T/2 and ending at f+T/2;

$I_s$ is an image frame with a hypothetical instantaneous exposure period taken at time h, h is an arbitrary time which is not constrained to be in the time interval $$\left[f - \frac{T}{2}, f + \frac{T}{2}\right],$$

ev(x2,y2,s) is a continuous function of time s, representing the received event stream ev(x2,y2,s)=$\sigma\delta_{r0}$(x2,y2, s) whenever there is an event [x2,y2,t0,$\sigma$] received from pixel (x,y) in the image plane (O2,x2,y2) of camera. EVC, triggered at time t0, with a logarithmic brightness threshold c, and with a polarity $\sigma$=+1 if the brightness change is positive, and $\sigma$=−1 if negative, $\delta_{r0}$ being an impulse or Dirac function varying as a function of pixel coordinates (x2,y2) and time s, and being equal to zero except at time s=t0 where ev(x2,y2,t0)=$\sigma$;

m(x1,y1,p)=(x2,y2) is a transformation that maps each pixel in a frame provided by the frame-based camera FMC at coordinates (x1,y1) in the image plane (O1, x1,y1) to the image plane (O2,x2,y2) of the event-based camera EVC; and p is a parameter defined for one pixel and needed to perform such mapping which is reached for one value of p to be determined.

The brightness threshold c can have different, values for positive and negative polarities, but this possibility is omitted for clarity purpose.

The mapping function m could in theory be any mapping from the coordinate plane (O1,x1,y1) of the frame-based camera FMC to the coordinate plane (O2,x2,y2) of the event-based camera EVC. However, it is constrained under the widely used pin-hole camera model (see [10], Chapter 6) and thin lens assumption (see [11], Chapter 3). In practice, the mapping function m takes into account and removes lens distortion (using a model like [12]). According to algorithms disclosed in [13], image rectification can ensure that a point in a camera can be found in the other camera on the same vertical coordinate y. Rectification applies an homography $R_F$ and $R_E$ to each camera images, respectively from camera FMC and camera EVC. The transformation m can be defined for a pixel at coordinates (x,y) by the following equation:

$$m(x,y,p)=\text{dist}_E(R_E^{-1}(R_F\text{dist}_F^{-1}([x,y]^T)+([p,0]^T))),$$

where $\text{dist}_E$ and $\text{dist}_F^{-1}$ are respectively the forward distortion function of camera EVC and inverse distortion function of camera FMC, that model the camera lens distortions deviating from a perfect pin-hole projection model, $[x,y]^T$ represents the transpose of vector [x,y], and p is the parameter required to align the coordinates to the events. In the literature, p=d(x,y) is called "disparity map" and corresponds to a horizontal shift in a rectified camera system. Such functions can typically be obtained from a calibration procedure of the cameras.

Equation (1) can be written as follows:

$$I_s(x1, y1, h, p) = \frac{I\left(x1, y1, \left[f - \frac{T}{2}, f + \frac{T}{2}\right]\right)}{J(x1, y1, h, p)} \quad (3)$$

where:

$$J(x1, y1, h, p) = \frac{1}{T}\int_{f-\frac{T}{2}}^{f+\frac{T}{2}} e^{c\cdot INT(x1,y1,h,t,p)}dt \quad (4)$$

Since h is an arbitrary time, equations (3) and (4) can be used to produce an image $I_s$(x1,y1,h) with an instantaneous exposure period at any time h from image $$I\left(x1, y1, \left[f - \frac{T}{2}, f + \frac{T}{2}\right]\right)$$

with an exposure period T taken at time f by combining the images I and point matrix J.

From equations (3) and (4), it is possible to provide a single deblurred picture Is for each blurry frame I, to provide a deblurred video stream having the same frame rate as the initial video stream from the frame-based camera. According to an embodiment, equations (3) and (4) are applied multiple times by varying the value of h, to obtain multiple images between each pair of successive image frames I, to provide a slow motion video stream at a higher frame rate than that of image frames I.

Image J is computed at step S02 using equation (4) above, in the image plane (O1, x1, y1).

At step S03, the point matrix J is rectified to provide a rectified point matrix RJ having the given size of W×H points and where points of coordinates (x,y) are localized within the common image plane (O1, x, y). The image rectifications at steps S01 and S03 are performed so that the rectified image RI and the rectified point matrix RI look like to have the same focal length.

Image I may be blurry due to moving objects in the observed scene during the exposure time operated by the frame-based camera FMC. The blur can be corrected by integrating brightness changes recorded by the stream of events [x2,y2,t0,$\sigma$] during the frame-based exposure period T, using equation (3).

Point RJ(x,y,h,p) of the point matrix RJ represents a deblurring correction signal to be applied to rectified image RI. If the parameter p is correct, position of points RJ(x,y, h,p) in image RI(x,y) will be properly evaluated to produce the deblurred picture Is, which in turn will have sharp edges with smooth intensity gradients on non-edge pixels. Smoothness measures similarity of colors or grey levels that are close together.

However, if the duration of the exposure period T of the frame-based camera FMC is short enough, image frame I may be not blurred and have sharp edges that will be similar to the sharp edges of point matrix I/RJ(x,y,h,p). If the spatial alignment is correct between image I(x,y) and the point matrix RJ(x,y,h,p), the sharp structures will match and the overall smoothness of image Is will be preserved, as opposed to having double or ghost edges due to misalignments. It turns out that measuring the smoothness of Is can validate the spatial alignment between the pixels of image I and the events from the event-based camera EVC.

FIGS. 3A, 3B, 3C show curves C1-C5 of values of a line of pixels in the images I and Is to illustrate the spatial alignment objective, according to an embodiment. In FIG. 3A, curves C1, C2 show corresponding lines of pixels in the image Is to obtain and in blurry image I, respectively. The line of pixels appears to be sharper in image Is (C1) than in image I (C2). FIG. 3B shows a curve C3 representing the corresponding line of points in the point matrix 1/J which is defined to improve sharpness of image I and to obtain image Is. Curve C3 corresponds in the example of FIG. 3B, to the result of division at each pixel of the sharp signal C1 in image Is by the blurred signal C2 in image I. FIG. 3C shows curves C4, C5 of a corresponding line of pixels in an estimated image Is, when the spatial alignment between images I and Is is correct and not correct, respectively. Curve C5 shows that a spatial misalignment or offset introduces a double/ghost edge and thus decreases the smoothness of the reconstituted signal. Therefore, the objective is to estimate the parameter p by maximizing the smoothness of RI(x,y)/RJ(x,y,h,p) for each pixel of at least one patch of adjacent pixels.

At step S04, smoothness is evaluated using a chosen scoring function S(x,y,p) applied to the following function F:

$$F(x,y,p)=RI(x,y)/RJ(x,y,h,p)$$

At step S05, the parameter p is estimated by maximizing or minimizing the scoring function S for at least one patch of adjacent pixels, within a given range of disparities. The estimated parameter p to be searched for can either vary at every pixel (x,y) or be computed for at least one patch of adjacent pixels having a same transformed value.

Several scoring functions can be used to maximize the smoothness, such as:

L1 or L2 norm of 2D gradients of F(x,y,p), which is to be minimized, where:

$$L1 = \|\nabla F(x, y, p)\|_1 = \left|\frac{\partial F(x, y, p)}{\partial x}\right| + \left|\frac{\partial F(x, y, p)}{\partial y}\right|,$$

$$L2 = \|\nabla F(x, y, p)\|_2 = \sqrt{\left(\frac{\partial F(x, y, p)}{\partial x}\right)^2 + \left(\frac{\partial F(x, y, p)}{\partial y}\right)^2} \, ;$$

the variance of local patches of F(x,y,p), which is to be maximized;

a cross-correlation function between the image RI(x,y) and point matrix 1/RJ(x,y,p), which is to be maximized to find the best similarity between the signals.

Function F, the variance or the cross-correlation function can be previously transformed by the logarithm function. Also, the scoring function S can have a regularization term that would force the transformation field to vary smoothly, for example by weighting L1 norm of the gradient of the transformation map.

According to an embodiment, the smoothness of the transformation field can be enforced by using the cost aggregation method of the Semi-Global Matching algorithm [1], replacing the mutual information criterion with the L1 or L2 norm of the 2D gradients of function F(x,y,p), or with the variance of local patches, or a cross-correlation measure between patches in the image RI(x,y) and point matrix I/RJ(x,y,h,p).

According to another embodiment, another function is applied to the image RI(x,y) and point matrix RJ(x,y,p), for example a logarithm function, so that their relationship becomes log(I)−log(J)=log(Is). Using a logarithm function may lighten the computations for maximizing smoothness when searching for the best transformation m(x,y,p) by removing one division.

The methods disclosed above for maximizing smoothness can be applied iteratively, where an approximate of the parameter p is first used and iteratively refined using the result of the cost function applied to the previous iteration.

According to another embodiment, the parameter p is determined using a function that is learned from many examples of correct solutions, or from some sharpness cue.

Steps S01, S03 use a stereo frame rectification mechanism to bring both the image I and point matrix I to an intermediate resolution W×H, which is preferably the resolution of the (smaller) event-based visual EVS to have fewer computations in the computation of the parameter p or transformation map m(x,y,p). An even smaller resolution could be chosen for faster processing.

It is observed that the rectification steps S01 and S03 are optional. If the image and point matrix I are rectified, the transformation map tri(x,y,p) can be written as m(x,y,d(x, y))=distE(RE−1(RF distF−1([x,y]T)+([d(x,y),0]T))), and the parameter p=d(x,y) represents the disparity or shift along axis x.

If the images I and point matrix I are not rectified, the disparity is no longer horizontal (along x coordinate) and the transformation m(x,y,p) can be written m(x,y,dx(x,y), dy(x, y))=distE(distF−1([x,y]T)+([dx(x,y),dy(x,y)]T))), where dx(x,y) and dy(x,y) are components of the disparity of the pixel at coordinates (x,y) in the x and y directions. The set of disparity values at each pixel location forms a disparity map.

According to an embodiment, the estimated disparity map or parameters p are used to determine a depth map for some or all pixel events provided by camera EVC, as the depth of an imaged object at a pixel is inversely proportional to its disparity on the sensors. The depth of a pixel at coordinates (x,y) cars be computed using the following equation:

$$d(x,y)=dx \cdot fl/z, \tag{5}$$

where dx is the distance [O1,O2] between origin points O1, O2 of the rectified image planes of cameras FMC, EVC, fl is the focal length of the cameras after rectification, and z is the depth of the object imaged by the pixel at coordinates (x,y). The disparity or depth map thus obtained is defined in the coordinate plane (O1,x,y). The disparity or depth map can be unrectified to be defined in the coordinate plane (O1,x1,y1) or (O2,x2,y2). The depth map gives the depth of moving objects in the frames provided by camera FMC.

According to an embodiment, steps S06 to S08 are performed after step S05. At step S06, the point matrix EU is corrected using the parameter p estimated at step S05 by applying to each point RJ(x,y,h,p) of point matrix RJ, the following computation: RJ'(x,y,h)=RJ(m(x,y,p),h). It should be observed here that the transformation m(x,y,p) does not necessarily provide integer numbers. Therefore, step S06 may lead to interpolation computations between pixels transformed by m(x,y,p) to obtain a pixel value having integer coordinates.

At step S07, point matrix RJ' obtained at step S06 is oversampled back to the resolution of the frame-based camera FMC to obtain an unrectified point matrix J' in the image plane (O1,x1,y1). Thus, the point matrix I' is defined in the image plane of camera FMC. At step S08, the deblurred image Is is computed by applying equation (3) to all pixels of the image I and points of the point matrix J', J' representing a deblurring signal. Thus, each pixel of the deblurred image Is is computed as follows:

$$Is(x1,y1,h,p)=I(x1,y1)/J(x1,y1,h,p).$$

In the case of a rolling shutter frame-based camera, the point matrix J is computed at step S02 according to the following equation:

$$J(x1, y1, h, p) = \frac{1}{T}\int_{Es(x1,y1)}^{Ee(x1,y1)} e^{c \cdot INT(x1,y1,h,t,p)}dt \tag{6}$$

where Es(x1,y1) and Ee(x1,y1) are functions that give respectively the start and end of the exposure period of pixel at coordinates (x1,y1) in the frame I. Function Es can be computed using the time is of the start of the exposure period at the first row or column of the frame I, and a rolling shutter skew Rs corresponding to an offset between the starts of the exposure periods of two consecutive rows or columns of the frame I (FIG. 4).

FIG. 4 depicts the exposure timings of a vertical rolling shutter sensor. Each row R0, R1, . . . , Rn of pixels of the rolling shutter sensor is exposed during an exposure period of the same duration Tr, shown in FIG. 4 by a rectangle RE. The start of exposure period RE of each row R0-Rn is offset by the rolling shutter skew Rs compared to the previous row. In contrast, the exposure periods of the pixel rows in a global shutter sensor are all identical, as shown in FIG. 4 by a single central rectangle GE. The duration T of the exposure period of the global shutter sensor may be the same as or different from the duration Tr of the row exposure periods.

If the sensor has a vertical rolling shutter starting from top to bottom, and the y coordinate varies from 0 (top of the sensor) to height-1 (bottom or last row of the sensor), function Es(x,y) can be computed as Es(x,y)=ts+y·Rs. Function Es(x,y) has a same value for all pixels lying on the same row.

Function Ee(x,y) can be computed as Ee(x,y)=Es(x,y)+Tr, where Tr is the duration of the exposure period of one row of image I. Alternatively, function Ee can also be computed as Ee(x,y)=te+y·Rs, to being the time of the end of the exposure period at the first row of the frame I.

It can be observed that the point matrix J is defined only for points corresponding to pixel events occurring during the exposure period T. The other points are undefined and may be set to any arbitrary value, for example 0 or the value of the nearest defined point.

The method of FIG. 2 appears to be efficient when the exposure time of the frame is sufficiently large to have enough events recorded within it (e.g. more than two events). In fact, if only a few events are recorded, there might be not enough events to match with the image I recorded by the frame-based camera FMC. In this case, or when more generally it is desired to register events that occur out of the frame exposure periods I', the integral of brightness changes recorded by the events can be approximated as a difference between two successive image frames I(x1,y1,f) and I(x1,y1,f+F), as shown in the following equation:

$$I(x1,y1,f+F)=I(x1,y1,f)e^{c \cdot INT(x1,y1,f,f+F,p)} \quad (7)$$

or $$\frac{I(x1, y1, f + F)}{I(x1, y1, f)} = e^{c \cdot INT(x1,y1,f,f+F,p)} \quad (8)$$

where I(x1,y1,f) is a pixel of an image frame I(f) produced at time f and I(x1,y1,f+F) is a pixel of another image frame I(f+F) produced at a successive time f+F by camera FMC, and F is the duration of the frame period. Equation (7) or (8) again establishes a relationship between frames and events where the unique unknown variable is the pixel parameter p.

Figure 5:
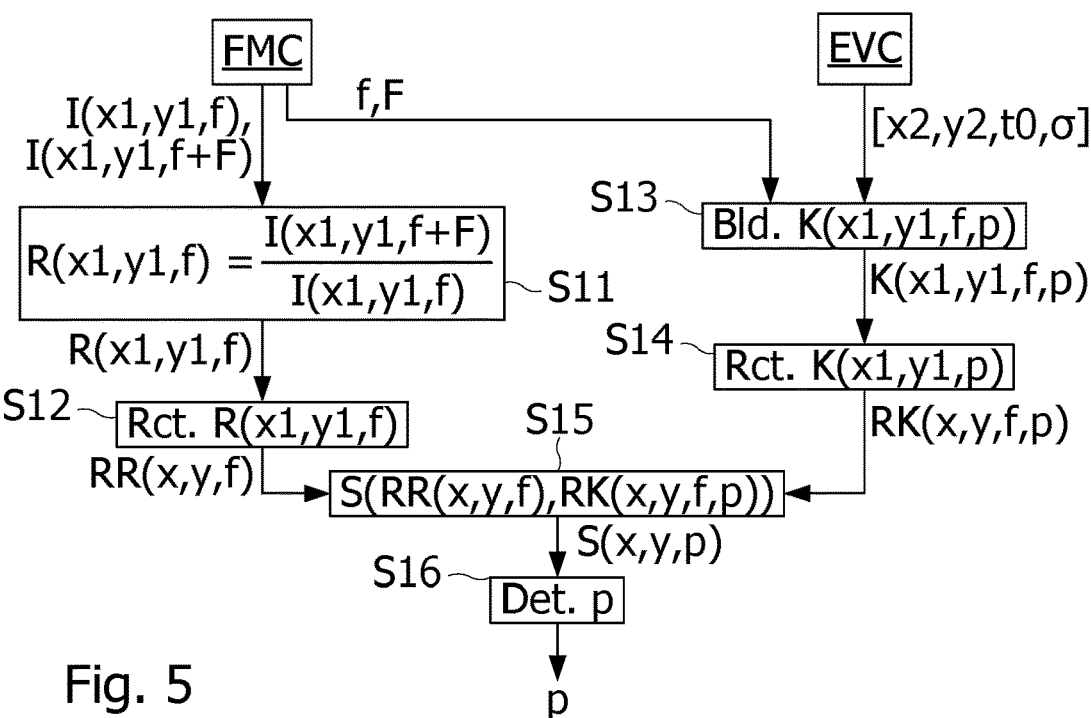
FIGS. 5, 6 illustrate block diagrams showing steps of a method for pixel-by-pixel registration of an event-based camera to a frame-based camera, according to other embodiments.

FIG. 5 illustrates steps S11 to S16 of another embodiment of a method that can be implemented by processor PRC, for pixel-by-pixel registration between the pixels of the frames provided by the frame-based camera FM and the pixel events provided by the event-based camera EVC. In step S11, two successive image frames I(f) and I(f+F) provided by the frame-based camera FMC are processed to compute a point matrix R for each time f as follows:

$$R(x1, y1, f) = \frac{I(x1, y1, f + F)}{I(x1, y1, f)}, \quad (9)$$

where (x1,y1) are coordinates of points in the image plane (O1, x1, y1) of camera MC. Then, at step S12, the point matrix R is rectified to provide a rectified point matrix RR having a given size of W×H points and where points are localized within a common image plane (O1, x, y).

Steps S13 and S14 can be performed in parallel with steps S11 and S12. At step S13, a point matrix K is built from the event stream [x2,y2,t0,σ] produced by camera EVC in the image plane (O2, x2, y2) of camera EVC. Step S13 is performed using the instant f and the frame period F provided by camera FMC, the point matrix K being computed using the following equation:

$$K(x1,y1,p)=e^{c \cdot INT(x1,y1,f,f+F,p)} \quad (10)$$

INT(x1,y1,f,f+F,p) being defined by equation (2). Points of the point matrix K represent brightness ratio changes recorded by the pixel events from the event stream provided by camera EVC, occurring during the frame period F.

Then, at step S14, the point matrix K is rectified to provide a rectified point matrix RK having the given size of W×H points and where points are localized within the common image plane (O1, x, y).

At step S15, a scoring function S(RR(x,y),RK(x,y,p)) comparing the image RR and point matrix RK is evaluated. The scoring function S can evaluate the correlation between patches of adjacent points in the point matrices RR and RK by summing point-wise products of their values, or summing their absolute or squared point-wise differences.

According to another example, the scoring function can be applied to the following function F':

$$F'(x,y,p)=RR(x,y)/RK(x,y,p),$$

where the value of parameter p is estimated such that F'(x,y,p) is as close as possible to 1 for each point of at least one patch of adjacent points.

At step S16, the parameter p is estimated for each point of one or more patches of adjacent points in the rectified point matrices RR and RK. This operation may be performed by maximizing the scoring function S when it evaluates correlation between points in point matrices RR and RK. Correlation between points may be evaluated by computing a sum of absolute or squared differences between patches of adjacent points in both point matrices. In this case, correlation is high when the computed sum of differences is small.

As in the method of FIG. 2, the parameter p can be used to compute a disparity or depth map for one or more pixel patches, e.g. of moving objects present in the frames provided by camera FMC, or for all image pixels. Then the disparity or depth map may be unrectified into a disparity or depth map having the dimensions of the image plane (O2, x2,y2) of the event-based camera EVC. This unrectification operation may also be performed to the dimensions of the image plane (O1,x1,y1) of the frame-based camera FMC. If the frame camera FMC uses a rolling shutter sensor, equation (10) becomes:

$$K(x1,y1,p)=e^{c \cdot INT(x1,y1,Ee(x1,y1),EsF(x1,y1),p)} \quad (11)$$

where Ee(x1,y1) and EsF(x1,y1) are functions that give respectively the end of the exposure period of pixel (x1,y1) in the first frame, and the start of the exposure period of pixel (x1,y1) in the second frame.

Figure 6:
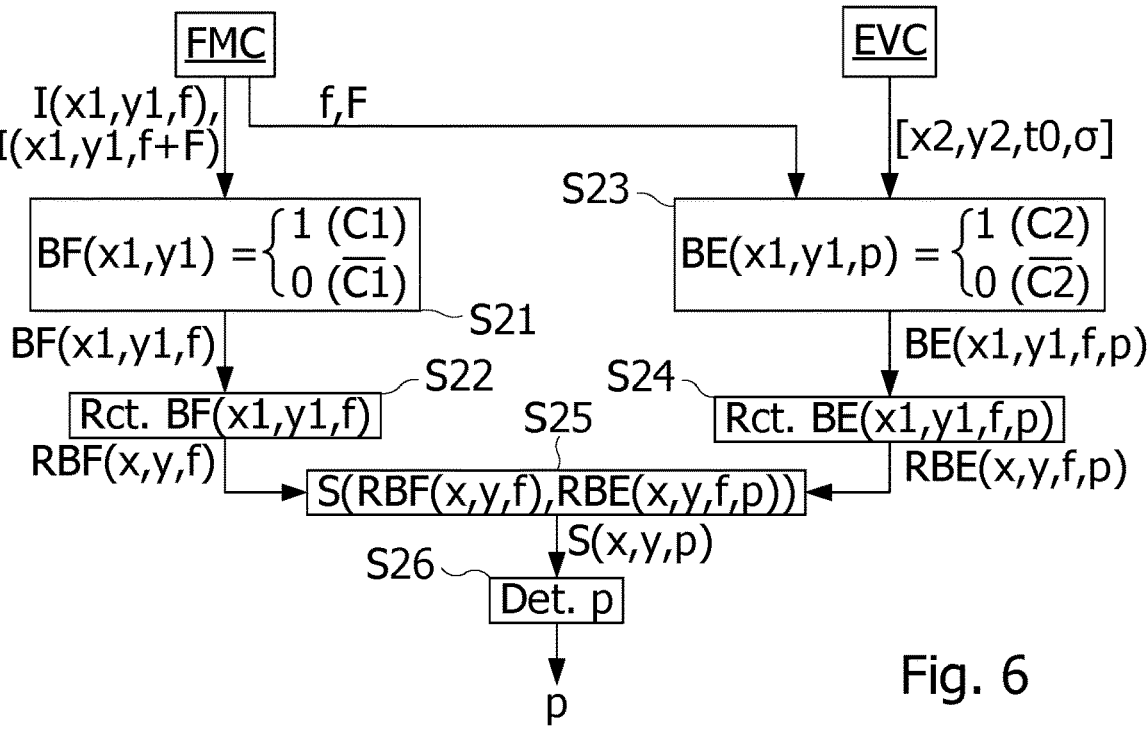

FIG. 6 illustrates steps S21 to S26 of another embodiment of a method that can be implemented by processor PRC, for pixel-by-pixel registration between the pixels of the frames provided by the frame-based camera. FMC and the pixel events provided by the event-based camera EVC. The method of FIG. 6 presents the advantage of having a very low computational complexity with regard to the methods of FIGS. 2 and 5. In step S21, two successive image frames I(x1,y1,f) and I(x1,y1,f+F) provided by the frame-based camera FMC are processed to compute a binary point matrix BF defined as follows:

$$BF(x1, \ y1) = \begin{cases} 1 & \text{if condition } C1 \text{ is true} \\ 0 & \text{if condition } C1 \text{ is false} \end{cases} \qquad (12)$$

where condition C1 is defined as follows:

$$C1:I(x1,y1,f+F) > e^c \cdot I(x1,y1,f) \text{ or } I(x1,y1,f+F) < e^{-c} \cdot I(x1, y1,f).$$

Thus a point value at coordinates (x1,y1) in the point matrix BF is set to 1 if a brightness change occurs in the logarithmic domain when comparing the corresponding pixels at the same coordinates (x1,y1) in images I(f) and I(f+f), and set to 0 otherwise. The binary point matrix BF is computed in the image plane (O1, x1, y1) of camera FMC. Then, at step S22, the point matrix BF is rectified to provide a rectified point matrix RBF having a given size of W×H points and where points are localized within a common image plane (O, x, y). The origin O can be chosen to coincide with point O1.

Steps S23 and S24 can be performed in parallel with steps S21 and S22. At step S23, a binary point matrix BE is built from the event stream [x2,y2,t0,σ] produced by camera ENT in the image plane (O2, x2, y2) of camera EVC. Step S23 is performed using the instant f and the frame period F provided by camera FMC, the point matrix BE being computed using the following equation:

$$BE(x2, \ y2, \ p) = \begin{cases} 1 & \text{if condition } C2 \text{ is true} \\ 0 & \text{if condition } C2 \text{ is false} \end{cases} \qquad (13)$$

where condition C2 is true when an event is received for pixel (x2,y2) from camera ENT between the times f and f+F, the parameter p being determined such that m(x1,y1,p)=(x2, y2). Thus a point value at coordinates (x2,y2) in the point matrix BE is set to 1 if at least an event has been generated by camera ENT due to a brightness change between times f and f+F, and set to C) otherwise.

Then, at step S24, the point matrix BE is rectified to provide a rectified point matrix RBE having the given size of W×H points and where points are localized within the common image plane (O, x, y). According to an embodiment, the rectification is performed in such a way that the points of the obtained rectified point matrix RBE remain either 0 or 1.

At step S25, correlation between the point matrices RBF and RBE is evaluated using a chosen scoring function S(RBF(x,y),RBE(x,y,p)).

According to an example, the scoring function S is applied to the following function F1:

$$F1(x,y,p)=RBF(x,y)-RBE(x,y,p),$$

each point value RBF(x,y) or RBE(x,y,p) being equal either to 0 or 1. In that case, the scoring function S may be the sum of absolute values or squared values of F1 over one or more patches of adjacent points. Thus, the scoring function S(F1) estimates decorrelation between the point matrices RBF and RBE and should be minimized for at least one patch of adjacent points.

According to another example, the scoring function S is applied to the following function F2:

$$F2(x,y,p)=RBF(x,y)(AND)RBE(x,y,p),$$

The scoring function S can be equal to the number of values of F2 equal to 1 over one or more patches of points. In this case, the scoring function S(F2) estimates correlation between the point matrices REF and RBE and should be maximized for at least one patch of adjacent points.

At step S26, the parameter p is estimated over one or more patches of adjacent points in the rectified point matrices RBF and RBE. This operation may be performed by minimizing the scoring function S(F1) or maximizing the scoring function S(F2).

As in the method of FIG. 2, the parameter p can be used to compute a disparity map d(x,y) or depth map for one or more pixel patches, e.g. of moving objects present in the frames provided by camera FMC, or for all image pixels. Then the disparity or depth map may be unrectified into a disparity or depth map in the image plane (O2,x2,y2) of the event-based camera ENT or in the image plane (O1,x1,y1) to the dimensions of the image frames of camera FMC.

Steps S02, S03 and S05 to S08 may be performed after step S16 or S26 to deblur image frame I.

It should be observed that the methods of FIGS. 5 and 6 do not consider events occurring during the exposure period of the corresponding frame, but all events occurring between two frames.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

In this regard, the methods disclosed in FIGS. 2, 5 and 6 may be performed without computing all the point positions (x,y) for the complete point matrix RJ, RK or RBE. In addition, it is not necessary to store all pixel positions (x,y) and disparity map, to compute the points of point matrix RJ' at step S06 (FIG. 2) or to compute a depth map.

Further, the disclosure and the illustrations are to be considered as illustrative rather than restrictive, and the appended claims are intended to cover all such modifications, enhancements and other embodiments. Which all within the true spirit and scope of the description. Thus, the scope of the following claims is to be determined by the broadest permissible interpretation of the claims and their equivalents, and shall not be restricted or limited by the foregoing description.

CITED REFERENCES

[1] H. Hirschmuller, "Stereo processing by semiglobal matching and mutual information". IEEE Transactions on Pattern Analysis and Machine Intelligence, 30(2): 328-341 (2007)

[2] G. Van Meerbergen, M. Vergauwen, M. Pollefeys et al. "A Hierarchical Symmetric Stereo Algorithm Using Dynamic Programming", International Journal of Computer Vision, 47, 275-285 (2002).

[3] Jian Sun, Nan-Hing Zheng, and Heung-Yeung Shum, "Stereo matching using belief propagation," IEEE Transactions on Pattern Analysis and Machine Intelligence, vol. 25, no. 7, pp. 787-800, July 2003

[4] Y. Boykov, O. Veksler and R. Zabih, "Fast approximate energy minimization via graph cuts," IEEE Transactions on Pattern Analysis and Machine Intelligence, vol. 23, no. 11, pp. 1222-1239, November 2001

[5] O. Sauer, K. Köser, J. Bouguet and M. Pollefeys, "Rolling Shutter Stereo," IEEE International Conference on Computer Vision, Sydney, NSW, pp. 465-472 (2013)

[6] P. Rogister, R. Benosman, S. Ieng, P. Lichtsteiner and T. Delbruck, "Asynchronous Event-Based Binocular Stereo Matching," IEEE Transactions on Neural Networks and Learning Systems, vol. 23, no. 2, pp. 347-353, February 2012

[7] L. Pan, R. Hartley, C. Scheerlinck, M. Liu, X. Yu and Y. Dai, "High Frame Rate Video Reconstruction based on an Event Camera," IEEE Transactions on Pattern Analysis and Machine Intelligence (2020)

[8] G. Gallego, M. Gehrig and D. Scaramuzza, "Focus Is All You Need: Loss Functions for Event-Based Vision," IEEE/CVF Conference on Computer Vision and Pattern Recognition (CVPR), Long Beach, CA, USA, 2019, pp. 12272-12281 (2019)

[9] D. Perrone, P. Favaro, "A Logarithmic Image Prior for Blind Deconvolution", Int J Comput Vis 117, 159-172 (2016)

[10] R. Hartley and A. Zisserman, "Multiple View Geometry in Computer Vision" (2nd. ed.), 2003, Cambridge University Press, USA.

[11] Y. Ma, S. Soatto, J. Koseck, and S. Shankar Sastry, "An Invitation to 3-D Vision: From Images to Geometric Models", 2010, Springer Publishing Co., Inc.

[12] J. Weng, P. Cohen, and M. Herniou, "Camera calibration with distortion models and accuracy evaluation", IEEE Transactions on Pattern Analysis and Machine Intelligence, 14(10):965-980, October 1992

[13] M. Pollefeys, R. Koch, L, Van Gool, "A simple and efficient rectification method for general motion", Proc. International Conference on Computer Vision, 496-501, (1999), Retrieved 2011 Jan. 19

[14] R. Benosman, S. Sio-Hoï Ieng, P. Rogister and C. Posch, "Asynchronous Event-Based Hebbian Epipolar Geometry", in IEEE Transactions on Neural Networks, vol. 22, no. 11, pp. 1723-1734, November 2011

What is claimed is:

1. A method for pixel-by-pixel registration of an event-based camera to a frame-based camera, the method comprising:

acquiring an image frame from the frame-based camera, using an exposure period;

rectifying the image frame to generate a rectified image;

acquiring a pixel event stream generated during the exposure period;

generating a first point matrix from pixel events of the pixel event stream, wherein each point of the first point matrix integrates the variation contributions of all events of the corresponding pixel during the exposure period;

rectifying the first point matrix to generate a rectified first point matrix;

computing a comparison function by comparing the rectified image and the rectified first point matrix modified by a disparity map;

computing a smoothness scoring function applied to the comparison function while varying the disparity map;

selecting the disparity map that optimizes the smoothness scoring function; and performing pixel-by-pixel registration by applying the selected disparity map to establish correspondence between pixels of the rectified image and the rectified first point matrix.

2. The method of claim 1, further comprising the step of generating a deblurred image at a selected time within the exposure period, wherein:

a deblurring correction matrix is computed as a function of the selected disparity map and the selected time;

the deblurring correction matrix is unrectified to project it onto a coordinate plane of the frame-based camera; and the deblurred image is computed as an element-by-element ratio of the rectified first point matrix and the deblurring correction matrix.

3. The method of claim 1, wherein the smoothness scoring function is one of the following functions:

a norm of 2D gradients of the comparison function, a variance of local patches of the comparison function, and a cross-correlation function applied to the rectified image and the rectified first point matrix.

4. A method for pixel-by-pixel registration of an event-based camera to a frame-based camera, the method comprising:

acquiring an image frame from the frame-based camera, using an exposure period;

rectifying the image frame to generate a rectified image;

acquiring a pixel event stream generated during the exposure period;

generating a first point matrix from pixel events of the pixel event stream, wherein each point of the first point matrix integrates the variation contributions of all events of the corresponding pixel during the exposure period;

rectifying the first point matrix to generate a rectified first point matrix;

computing a comparison function by comparing the rectified image and the rectified first point matrix modified by a disparity map;

computing a smoothness scoring function applied to the comparison function while varying the disparity map;

selecting the disparity map that optimizes the smoothness scoring function; and generating a deblurred image at a selected time within the exposure period by applying the selected disparity map, wherein:

the rectified first point matrix represents a deblurring correction matrix computed as a function of the selected disparity map and the selected time; and the deblurred image is computed as an element-by-element ratio of the rectified image and the rectified first point matrix.

5. A stereo camera device comprising:

a frame-based camera;

an event-based camera; and a processor receiving and processing signals provided by the frame-based and event-based cameras, the processor configured to:

acquire an image frame from a frame-based camera using an exposure period;

rectify the image frame to generate a rectified image;

acquire a pixel event stream generated during the exposure period;

generate a first point matrix from pixel events of the pixel event stream, wherein each point of the first point matrix integrates the variation contributions of all events of the corresponding pixel during the exposure period;

rectify the first point matrix to generate a deblurring correction rectified first point matrix;

compute a comparison function by comparing the rectified image and the rectified first point matrix modified by a disparity map;

compute a smoothness scoring function applied to the comparison function while varying the disparity map;

select the disparity map that optimizes the smoothness scoring function; and perform pixel-by-pixel registration by applying the selected disparity map to establish correspondence between pixels of the rectified image and the rectified first point matrix.

6. The stereo camera device of claim 5, wherein the processor is further configured to generate a deblurred image at a selected time within the exposure period, wherein:

a deblurring correction matrix is computed as a function of the selected disparity map and the selected time;

the deblurring correction matrix is unrectified to project it onto a coordinate plane of the frame-based camera; and the deblurred image is computed as an element-by-element ratio of the rectified first point matrix and the deblurring correction matrix.

7. The stereo camera device of claim 5, wherein the smoothness scoring function is one of the following functions:

a norm of 2D gradients of the comparison function, a variance of local patches of the comparison function, and a cross-correlation function applied to the rectified image and the rectified first point matrix.

8. The method of claim 1, wherein an element-by-element comparison between the rectified image and the rectified first point matrix is an element-by-element ratio of the rectified image and the rectified first point matrix.

9. A method for pixel-by-pixel registration of an event-based camera to a frame-based camera, the method comprising:

acquiring successive image frames from the frame-based camera over an acquisition period;

generating a first point matrix from the successive image frames, wherein each point of the first point matrix represents a variation in brightness of a corresponding pixel location of the successive image frames;

rectifying the first point matrix to generate a rectified first point matrix;

acquiring a pixel event stream generated during the acquisition period;

generating a second point matrix from pixel events of the pixel event stream, wherein each point of the second point matrix represents an aggregation of event data corresponding to a pixel location over the acquisition period;

rectifying the second point matrix to generate a rectified second point matrix;

computing a comparison function by comparing the rectified first point matrix and the rectified second point matrix modified by a disparity map;

computing a correlation scoring function applied to the comparison function while varying the disparity map; and selecting the disparity map that optimizes the correlation scoring function; and performing pixel-by-pixel registration by applying the selected disparity map to establish correspondence between pixel events from the event-based camera and pixels in the image frames from the frame-based camera.

10. The method of claim 9, wherein:

the first point matrix is generated by computing brightness ratio changes between successive image frames acquired from the frame-based camera during the acquisition period; and;

the second point matrix is generated by integrating brightness ratio changes derived from pixel events of the pixel event stream over the acquisition period.

11. The method of claim 9, wherein:

the first point matrix is generated by assigning a binary value for each point based on whether a brightness change at a corresponding pixel location between successive image frames exceeds a predetermined threshold; and the second point matrix is generated by assigning a binary value to each point based on the presence or absence of pixel events at the corresponding pixel location during the acquisition period.

12. The method of claim 9, wherein the correlation scoring function is one of the following functions:

a cross-correlation function applied to at least one patch of adjacent points of the first and second point matrices, a sum of absolute point-wise differences applied to at least one patch of adjacent points of the first and second point matrices, and a sum of squared point-wise differences applied to at least one patch of adjacent points of the first and second point matrices.

13. The method of claim 11, wherein the correlation scoring function evaluates similarity between the first point matrix and the second point matrix using logical operations applied to patches of adjacent points in the first and second point matrices.

14. The method of claim 4, wherein the deblurred image is generated at multiple selected times between two successive image frames produced by the frame-based camera to provide a slow-motion video stream at a higher frame rate than a frame rate of the frame-based camera.

15. The method of claim 4, wherein the smoothness scoring function is one of the following functions:

a norm of 2D gradients of the comparison function, a variance of local patches of the comparison function, and a cross-correlation function applied to the rectified image and the rectified first matrix.

16. A stereo camera device comprising:

a frame-based camera;

an event-based camera; and a processor receiving and processing signals provided by the frame-based and event-based cameras, the processor configured to:

acquire an image frame from a frame-based camera using an exposure period;

rectify the image frame to generate a rectified image;

acquire a pixel event stream generated during the exposure period;

generate a first point matrix from pixel events of the pixel event stream, wherein each point of the first point matrix integrates the variation contributions of all events of the corresponding pixel during the exposure period;

rectify the first point matrix to generate a deblurring correction rectified first point matrix;

compute a comparison function by comparing the rectified image and the rectified first point matrix modified by a disparity map;

compute a smoothness scoring function applied to the comparison function while varying the disparity map;

select the disparity map that optimizes the smoothness scoring function; and generate a deblurred image at a selected time within the exposure period by applying the selected disparity map, wherein:

the rectified first point matrix represents a deblurring correction matrix computed as a function of the selected disparity map and the selected time; and the processor is configured to compute the deblurred image as an element-by-element ratio of the rectified image and the rectified first point matrix.

17. The stereo camera device of claim 16, wherein the smoothness scoring function is one of the following functions:

a norm of 2D gradients of the comparison function, a variance of local patches of the comparison function, and a cross-correlation function applied to the rectified image and the rectified first point matrix.

* * * * *